(12) United States Patent
Wang et al.

(10) Patent No.: US 10,511,544 B2
(45) Date of Patent: Dec. 17, 2019

(54) PATH COMPUTATION ELEMENT PROTOCOL RESPONSE AND SIMPLE NETWORK MANAGEMENT PROTOCOL CONFIRMATION FOR TUNNEL CONFIGURATION

(71) Applicant: AT&T Intellectual Property I, L.P., Atlanta, GA (US)

(72) Inventors: Heng Wang, Holmdel, NJ (US); Leah Zhang, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 63 days.

(21) Appl. No.: 15/358,306

(22) Filed: Nov. 22, 2016

(65) Prior Publication Data
US 2018/0145929 A1    May 24, 2018

(51) Int. Cl.
| | | |
|---|---|---|
| *H04L 12/911* | (2013.01) | |
| *H04L 12/24* | (2006.01) | |
| *H04L 12/755* | (2013.01) | |
| *H04L 12/26* | (2006.01) | |

(Continued)

(52) U.S. Cl.
CPC ........ *H04L 47/825* (2013.01); *H04L 41/0213* (2013.01); *H04L 43/0882* (2013.01); *H04L 45/021* (2013.01); *H04L 45/50* (2013.01); *H04L 45/52* (2013.01)

(58) Field of Classification Search
CPC . H04L 47/825; H04L 41/0213; H04L 45/021; H04L 45/50; H04L 45/52
See application file for complete search history.

(56) References Cited

U.S. PATENT DOCUMENTS

| | | |
|---|---|---|
| 7,646,733 B2 | 1/2010 | Ballantyne et al. |
| 7,689,693 B2 | 3/2010 | Doshi et al. |
| 8,477,627 B2 | 7/2013 | Bosloy et al. |

(Continued)

FOREIGN PATENT DOCUMENTS

| | | |
|---|---|---|
| JP | 2005252385 | 9/2005 |
| WO | WO 2016/032552 | 3/2016 |

(Continued)

OTHER PUBLICATIONS

Aguado, Alejandro, et al. "ABNO: A feasible SDN approach for multivendor IP and optical networks [invited]." Journal of Optical Communications and Networking 7.2 (2015): A356-A362. http://www.alejandroaguadomartin.com/paper/New%20Multi-layer%20ABNO%20v1.6.pdf.

(Continued)

*Primary Examiner* — Peter P Chau

(57) ABSTRACT

Devices, computer-readable media and methods are disclosed for managing path utilizations for telecommunication network tunnels. For example, a processor deployed in a telecommunication network may receive a request from a router of the telecommunication network for a tunnel to a destination in the telecommunication network, send a response to the router that includes at least one path comprising the tunnel through the telecommunication network to the destination, receive a trap message from the router that includes a confirmation that the at least one path is utilized by the router, and update at least one record for the at least one path in response to the trap message, where the at least one record indicates a status of a utilization of the at least one path.

20 Claims, 4 Drawing Sheets

(51) Int. Cl.
*H04L 12/723* (2013.01)
*H04L 12/781* (2013.01)

(56) References Cited

U.S. PATENT DOCUMENTS

| | | | |
|---|---|---|---|
| 8,824,274 | B1 | 9/2014 | Medved et al. |
| 8,855,014 | B2 | 10/2014 | Previdi et al. |
| 8,885,463 | B1 * | 11/2014 | Medved .................. H04L 45/50 370/228 |
| 8,942,226 | B2 | 1/2015 | Ong |
| 8,953,500 | B1 | 2/2015 | Shen et al. |
| 9,143,557 | B2 | 9/2015 | Guichard et al. |
| 9,178,796 | B2 | 11/2015 | Previdi et al. |
| 9,178,801 | B1 | 11/2015 | Guichard et al. |
| 9,258,238 | B2 | 2/2016 | Bahadur et al. |
| 9,350,635 | B2 | 5/2016 | Vasseur et al. |
| 9,450,817 | B1 | 9/2016 | Bahadur et al. |
| 9,450,864 | B2 | 9/2016 | Zhao et al. |
| 9,577,925 | B1 * | 2/2017 | Bahadur ................. H04L 45/50 |
| 2005/0220030 | A1 * | 10/2005 | Nagami .............. H04L 43/0817 370/241 |
| 2007/0274212 | A1 * | 11/2007 | Kolenchery ............ H04L 12/28 370/232 |
| 2010/0202297 | A1 * | 8/2010 | Liu .................... H04L 43/0811 370/242 |
| 2013/0201829 | A1 * | 8/2013 | Pacella .................. H04L 45/44 370/235 |
| 2013/0336159 | A1 * | 12/2013 | Previdi .................. H04L 45/50 370/254 |
| 2015/0023205 | A1 | 1/2015 | Vasseur et al. |
| 2015/0089081 | A1 | 3/2015 | Thubert et al. |
| 2015/0113151 | A1 | 4/2015 | Ong |
| 2015/0146536 | A1 | 5/2015 | Minei et al. |
| 2015/0249591 | A1 | 9/2015 | Alvarez et al. |
| 2015/0249593 | A1 | 9/2015 | Alvarez et al. |
| 2016/0191370 | A1 | 6/2016 | Wood |
| 2016/0285545 | A1 | 9/2016 | Schmidtke et al. |
| 2017/0070426 | A1 * | 3/2017 | Chen ...................... H04L 45/50 |
| 2017/0222934 | A1 * | 8/2017 | Ye ........................ H04L 47/125 |

FOREIGN PATENT DOCUMENTS

| | | |
|---|---|---|
| WO | WO 2016/102009 | 6/2016 |
| WO | WO 2016/124228 | 8/2016 |

OTHER PUBLICATIONS

King, Daniel, and Adrian Farrel. A PCE-based architecture for application-based network operations. No. RFC 7491. 2015. http://www.rfc-editor.org/rfc/rfc7491.txt.

Kos, Ana. "Segment routing principles and applications for SDN." (2016). https://www.politesi.polimi.it/bitstream/10589/120653/3/AnaKosThesisFinal.pdf.

Awduche, D., Berger, L., Gan, D., Li, T., Srinivasan, V., and G. Swallow, "RSVP-TE: Extensions to RSVP for LSP Tunnels", RFC 3209, Dec. 2001, http://www.rfc-editor.org/info/rfc3209.

Farrel, A., and D. King. Unanswered questions in the path computation element architecture. No. RFC 7399. 2014. https://www.rfc-editor.org/rfc/pdfrfc/rfc7399.txt.pdf.

* cited by examiner

PATH COMPUTATION ELEMENT PROTOCOL RESPONSE AND SIMPLE NETWORK MANAGEMENT PROTOCOL CONFIRMATION FOR TUNNEL CONFIGURATION

The present disclosure relates generally to telecommunication network operations, e.g., in a Multi-Protocol Label Switching (MPLS) network, and more particularly to devices, computer-readable media, and methods for managing path utilizations for telecommunication network tunnels.

BACKGROUND

Upgrading a telecommunication network to a software defined network (SDN) architecture implies replacing or augmenting existing network elements that may be integrated to perform a single function with new network elements. The replacement technology may comprise a substrate of networking capability, often called network function virtualization infrastructure (NFVI) that is capable of being directed with software and SDN protocols to perform a broad variety of network functions and services. Different locations in the telecommunication network may be provisioned with appropriate amounts of network substrate, and to the extent possible, routers, switches, edge caches, middle-boxes, and the like, may be instantiated from the common resource pool.

SUMMARY

In one example, the present disclosure discloses a device, computer-readable medium, and method for managing path utilizations for telecommunication network tunnels. For example, a processor deployed in a telecommunication network may receive a request from a router of the telecommunication network for a tunnel to a destination in the telecommunication network, send a response to the router that includes at least one path comprising the tunnel through the telecommunication network to the destination, receive a trap message from the router that includes a confirmation that the at least one path is utilized by the router, and update at least one record for the at least one path in response to the trap message, where the at least one record indicates a status of a utilization of the at least one path.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses devices, computer-readable media and methods for managing path utilizations for telecommunication network tunnels. For instance, examples of the present disclosure relate to multi-protocol label switching (MPLS) telecommunication networks with label switched router (LSRs) that are configured for Path Computation Element (PCE) management via Path Computation Element Protocol (PCEP). For instance, the telecommunication network may at least partially comprise software defined network (SDN) components that may be provisioned to function as various entities, including LSRs that are PCEP enabled. In one example, a PCE in accordance with the present disclosure may maintain a topology information block (TIB), e.g., a database with records for various paths that may be selected to comprise various tunnels, e.g., Traffic Engineering (TE) tunnels comprising label switched paths (LSPs) through the telecommunication network. The records may include statuses of respective paths, such as "available," "pending," and "confirmed." In one example, at least a portion of the information stored in the TIB may be derived and/or calculated from MIB information relating to various network components. In one example, the present disclosure further provides LSRs that send Simple Network Management Protocol (SNMP) trap messages to PCEs to confirm path utilizations in accordance with tunnels that are calculated by the PCEs. Thus, for example, a PCE may receive a request from a LSR to calculate a tunnel. The PCE may calculate the tunnel and may update records for paths of the tunnel from a status of "available" to a status of "pending." Upon receiving a SNMP trap message from the requesting LSR confirming the path utilizations, the PCE may further update the statuses from "pending" to "confirmed." These and other aspects of the present disclosure are discussed in greater detail below in connection with the examples of FIGS. 1-4.

Figure 1:
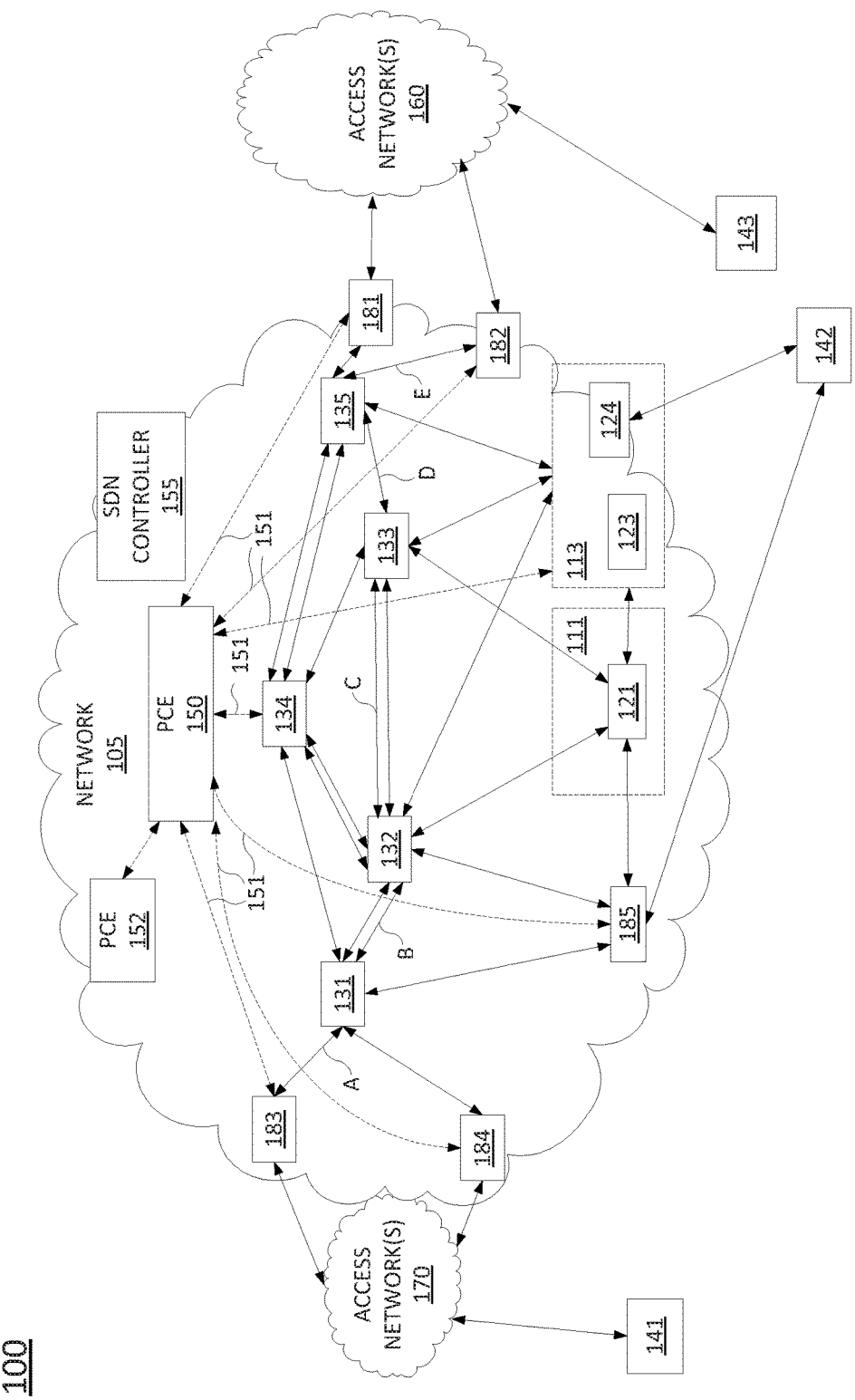
FIG. 1 illustrates an example system related to the present disclosure.

To aid in understanding the present disclosure, FIG. 1 illustrates a block diagram depicting one example of a network, or system 100 suitable for performing or enabling the steps, functions, operations, and/or features described herein. The overall communications system 100 may include any number of interconnected networks which may use the same or different communication technologies. As illustrated in FIG. 1, system 100 may include a network 105, e.g., a core telecommunication network. In one example, the network 105 may comprise a backbone network, or transport network, such as an Internet Protocol (IP)/Multi-Protocol Label Switching (MPLS) network, where label switched paths (LSPs) can be assigned for routing Transmission Control Protocol (TCP)/IP packets, User Datagram Protocol (UDP)/IP packets, and other types of protocol data units (PDUs) (broadly "traffic"). However, it will be appreciated that the present disclosure is equally applicable to other types of data units and network protocols. In this regard, it should be noted that as referred to herein, "traffic" may comprise all or a portion of a transmission, e.g., a sequence or flow, comprising one or more packets, segments, datagrams, frames, cells, PDUs, service data unit, bursts, and so forth. The particular terminology or types of data units involved may vary depending upon the underlying network technology. Thus, the term "traffic" is intended to refer to any quantity of data to be sent from a source to a destination through one or more networks. In addition, as used herein, the terms "configured" and "reconfigured" may refer to programming or loading a computing device with computer-readable/computer-executable instructions, code, and/or programs, e.g., in a memory, which when executed by a processor of the computing device, may cause the computing device to perform various functions.

The network 105 may alternatively or additional comprise components of a cellular core network, such as a Public Land Mobile Network (PLMN), a General Packet Radio Service (GPRS) core network, and/or an evolved packet core (EPC) network, an Internet Protocol Multimedia Subsystem (IMS) network, a Voice over Internet Protocol (VoIP) network, and so forth which may utilize label switching. In one example, the network 105 uses network function virtualization infrastructure (NFVI), e.g., servers in a data center or data centers that are available as host devices to host virtual machines (VMs) comprising virtual network functions (VNFs). In other words, at least a portion of the core telecommunications network 105 may incorporate software-defined network (SDN) components.

In one embodiment, the network 105 may be in communication with access networks 160 and access networks 170. Access networks 160 and 170 may comprise wireless networks (e.g., an Institute of Electrical and Electronics Engineers (IEEE) 802.11/Wi-Fi network and the like), a cellular access network (e.g., a Universal Terrestrial Radio Access Network (UTRAN) or an evolved UTRAN (eUTRAN), and the like), a circuit switched network (e.g., a public switched telephone network (PSTN)), a cable network, a digital subscriber line (DSL) network, a metropolitan area network (MAN), an Internet service provider (ISP) network, and the like. In one example, the access networks 160 and 170 may include different types of networks. In another example, the access networks 160 and 170 may be the same type of network. The access networks 160 and 170 may be controlled or operated by a same entity as that of network 105 or may be controlled or operated by one or more different entities. In one example, the access networks 160 and 170 may comprise separate domains, e.g., separate routing domains as compared to the network 105. In one example, access networks 160 and/or access networks 170 may represent the Internet in general.

In one example, network 105 may transport traffic to and from user devices 141-143. For instance, the traffic may relate to communications such as voice telephone calls, video and other multimedia, text messaging, email, and so forth among the user devices 141-143, or between the user devices 141-143 and other devices that may be accessible via access networks 160 and 170. User devices 141-143 may comprise, for example, cellular telephones, personal computers, other wireless and wired computing devices, private branch exchanges, customer edge (CE) routers, media terminal adapters, cable boxes, home gateways and/or routers, and so forth. In accordance with the present disclosure, user devices 141-143 may access network 105 in various ways. For example, user device 141 may comprise a cellular telephone which may connect to network 105 via access network 170, e.g., a cellular access network. For instance, in such an example access network 170 may include one or more cell sites, e.g., comprising, a base transceiver station (BTS), a NodeB, an evolved NodeB (eNodeB), or the like (broadly a "base station"), a remote radio head (RRH) and baseband unit, a base station controller (BSC) or radio network controller (RNC), and so forth. In addition, in such an example, components 183 and 184 in network 105 may comprise a serving gateway (SGW), a mobility management entity (MME), or the like. In one example, user device 142 may comprise a customer edge (CE) router which may provide access to network 105 for additional user devices (not shown) which may be connected to the CE router. For instance, in such an example, component 185 may comprise a provider edge (PE) router.

As mentioned above, various components of network 105 may comprise virtual network functions (VNFs) which may physically comprise hardware executing computer-readable/computer-executable instructions, code, and/or programs to perform various functions. As illustrated in FIG. 1, units 123 and 124 may reside on network function virtualization infrastructure (NFVI) 113, which is configurable to perform a broad variety of network functions and services. For example, NFVI 113 may comprise shared hardware, e.g., one or more host devices comprising line cards, central processing units (CPUs), or processors, memories to hold computer-readable/computer-executable instructions, code, and/or programs, and so forth. For instance, in one example unit 123 may be configured to be a firewall, a media server, etc., and unit 124 may be configured to be a PE router, e.g., a virtual provide edge (VPE) router, which may provide connectivity to network 105 for user device 142 and others. In one example, NFVI 113 may represent a single computing device. Accordingly, units 123 and 124 may physically reside on the same host device. In another example, NFVI 113 may represent multiple host devices such that units 123 and 124 may reside on different host devices. In one example, unit 123 and/or unit 124 may have functions that are distributed over a plurality of host devices. For instance, unit 123 and/or unit 124 may be instantiated and arranged (e.g., provisioned/programmed via computer-readable/computer-executable instructions, code, and/or programs) to provide for load balancing between two processors and several line cards that may reside on separate host devices.

In one example, network 105 may also include additional NFVI 111. For instance, unit 121 may be hosted on NFVI 111, which may comprise host devices having the same or similar physical components as NFVI 113. In addition, NFVI 111 may reside in a same location or in different locations from NFVI 113. As illustrated in FIG. 1, unit 121 may be configured to perform functions of an internal component of network 105. For instance, due to the connections available to NFVI 111, unit 121 may not function as a PE router, a SGW, a MME, a firewall, etc. Instead, unit 121 may be configured to provide functions of components that do not utilize direct connections to components external to network 105, such as a non-edge label switched router (LSR), or "intermediate node", a call control element (CCE), a media server, a domain name service (DNS) server, a gateway mobile switching center (GMSC), a short message service center (SMSC), etc.

In one example, NFVI 111 and unit 121, and NFVI 113 and units 123 and 124 may also be controlled and managed by a software defined network (SDN) controller 155. For instance, in one example, SDN controller 155 is responsible for such functions as provisioning and releasing instantiations of VNFs to perform the functions of routers, switches, and other devices, provisioning routing tables and other operating parameters for the VNFs, and so forth. In one example, SDN controller 155 may maintain communications with VNFs and/or host devices/NFVI via a number of control links which may comprise secure tunnels for signaling communications over an underling IP infrastructure of network 105. In other words, the control links may comprise virtual links multiplexed with transmission traffic and other data traversing network 105 and carried over a shared set of physical links. For ease of illustration the control links are omitted from FIG. 1. In one example, the SDN controller 155 may also comprise a virtual machine operating on NFVI/host device(s), or may comprise a dedicated device. For instance, SDN controller 155 may be collocated with one or more VNFs, or may be deployed in a different host device or at a different physical location.

Figure 4:
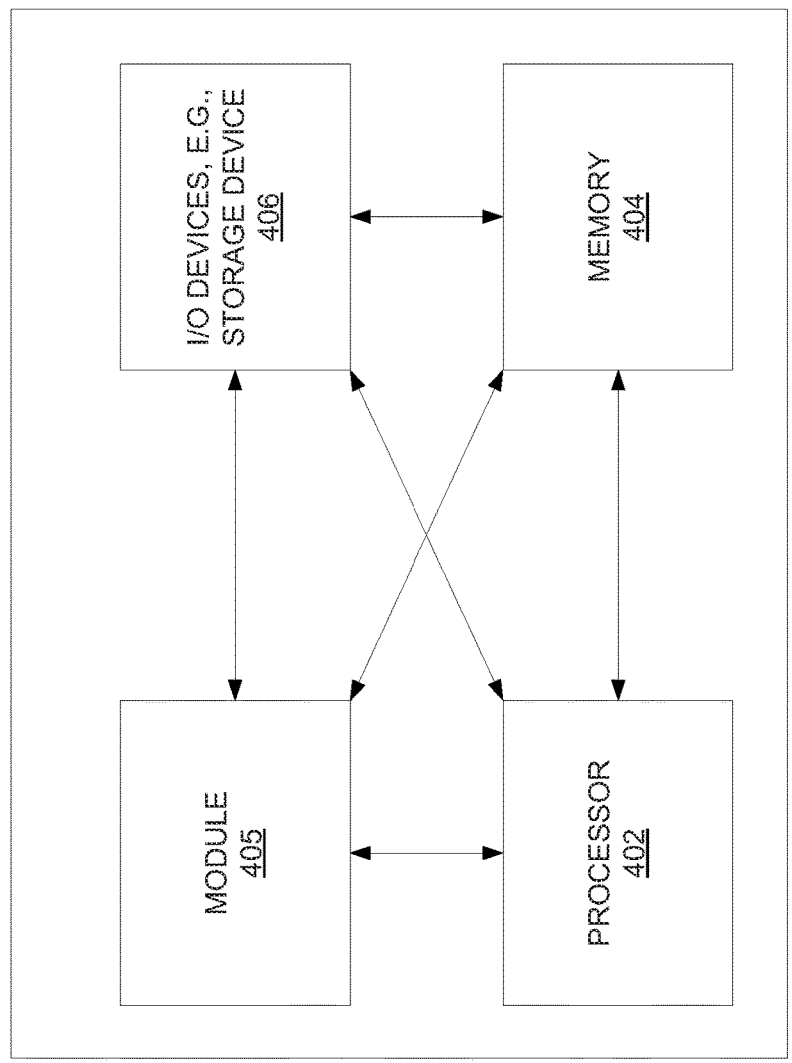
FIG. 4 illustrates an example high-level block diagram of a computer specifically programmed to perform the steps, functions, blocks, and/or operations described herein.

In one example, the SDN controller 155 may comprise a computing system or server, such as computing system 400 depicted in FIG. 4, and may be configured to provide one or more operations or functions in accordance with the present disclosure. For example, the functions of SDN controller 155 may include the selection of NFVI from among various NFVI available in network 105 (e.g., NFVI 111 or 113) to host various devices, such as routers, gateways, switches, etc., and the instantiation of such devices. For example, with respect to units 123 and 124, SDN controller 155 may download computer-executable/computer-readable instructions, code, and/or programs (broadly "provisioning code") for units 123 and 124 respectively, which when executed by a processor of the NFVI 113, may cause the NFVI 113 to perform as a label switched router (LSR), e.g., a label switched PE router, a gateway, a route reflector, a SGW, a MME, a firewall, a media server, a DNS server, a PGW, a GMSC, a SMSC, a CCE, and so forth. In one example, SDN controller 155 may download the provisioning code to the NFVI 113. In another example, SDN controller 155 may instruct the NFVI 113 to load the provisioning code previously stored on NFVI 113 and/or to retrieve the provisioning code from another device in network 105 that may store the provisioning code for one or more VNFs. The functions of SDN controller 155 may also include releasing or decommissioning unit 123 and/or unit 124 when no longer required, the transferring of the functions of units 123 and/or 124 to different NFVI, e.g., when NVFI 113 is taken offline, and so on.

As illustrated in FIG. 1, network 105 may also include internal nodes 131-135, which may comprise various components, such as routers, switches, route reflectors, etc., cellular core network, IMS network, and/or VoIP network components, and so forth. However, in accordance with the present disclosure it is assumed that internal nodes 131-135 comprise non-edge label switched routers (LSRs), e.g., intermediate nodes. In one example, these internal nodes 131-135 may also comprise VNFs hosted by and operating on additional NFVIs. For instance, as illustrated in FIG. 1, internal nodes 131 and 135 may comprise VNFs residing on additional NFVI (not shown) that are controlled by SDN controller 155 via additional control links. However, at least a portion of the internal nodes 131-135 may comprise dedicated devices or components, e.g., non-SDN reconfigurable devices.

Similarly, network 105 may also include components 181 and 182, e.g., label switched PE routers (or PE LSRs) interfacing with access network 160, and component 185, e.g., another PE LSR, which may interface with user device 142. For instance, in one example, network 105 may be configured such that user device 142 (e.g., a CE router) is dual-homed. In other words, user device 142 may access network 105 via either or both of unit 124 and component 185. As mentioned above, components 183 and 184 may comprise a serving gateway (SGW), a mobility management entity (MME), or the like. However, in another example, components 183 and 184 may also comprise PE routers (e.g., PE LSRs) interfacing with access networks 170, e.g., for non-cellular network-based communications. In one example, components 181-185 may also comprise VNFs hosted by and operating on additional NFVI. However, in another example, at least a portion of the components 181-185 may comprise dedicated devices or components.

For illustrative purposes, in one example, components 181-185 and unit 124 may comprise edge LSRs, while internal nodes 131-135, and unit 121 may be non-edge LSRs, or intermediate nodes, configured for MPLS routing within the network 105. In addition, in the present example, user devices 141-143 may comprise customer edge (CE) routers. Although some devices may comprise VNFs hosted on NFVI, other devices may comprise standalone or dedicated devices. However, for purposes of the present disclosure all of components 181-185, internal nodes 131-135, and units 121 and 124 may be configured as Path Computation Clients (PCCs) and may therefore communicate via PCEP to request tunnels (e.g., LSPs) from PCE(s), to receive responses with tunnels that are calculated, and so forth. As further illustrated in FIG. 1, the network 105 also includes path computation elements (PCEs) 150 and 152. In one example, PCEs 150 and 152 may each comprise a computing system or server, such as computing system 400 depicted in FIG. 4, and may be configured to provide one or more functions for managing path utilizations for telecommunication network tunnels, as described herein. PCEs 150 and 152 may be collocated with one or more of the internal nodes 131-135, components 181-185, or units 121 and 124, or may be deployed at a different physical location. PCE 150 and/or PCE 152 may also comprise a virtual machine operating on a host device, or may comprise a dedicated device. In one example, PCE 152 may function as a backup to PCE 150. Alternatively, or in addition, PCE 152 may be selected to manage path utilizations for tunnels in the network 105 relating to other components that are not shown in FIG. 1. For instance, network 105 may comprise a distributed PCE environment with multiple PCEs responsible for different zones, e.g., segregated by geographic area, by functionality type, etc.

In one example, PCE 150 may be selected to manage path utilizations for tunnels in the network 105 relating to components 181-185, internal nodes 131-135, and units 121 and 124. For instance, the PCE 150 may be selected by the SDN controller 155, and/or by the respective network devices functioning as PCCs. Accordingly, control links 151 between PCE 150 and other components of network 105 are shown in FIG. 1, e.g., edge-LSRs/PCCs including components 181-185, unit 121, and unit 124. For example, control links 151 may represent transmission TCP-based PCEP sessions. Alternatively, or in addition, control links 151 may comprise secure tunnels for signaling communications over an underling IP infrastructure of network 105, e.g., virtual links multiplexed with transmission traffic and other data traversing network 105 and carried over a shared set of physical links. In one example, PCEs 150 and 152 may also maintain a PCEP session to exchange notifications. For ease of illustration, links between PCE 152 and various components of network 105 are omitted from FIG. 1.

Figure 2:
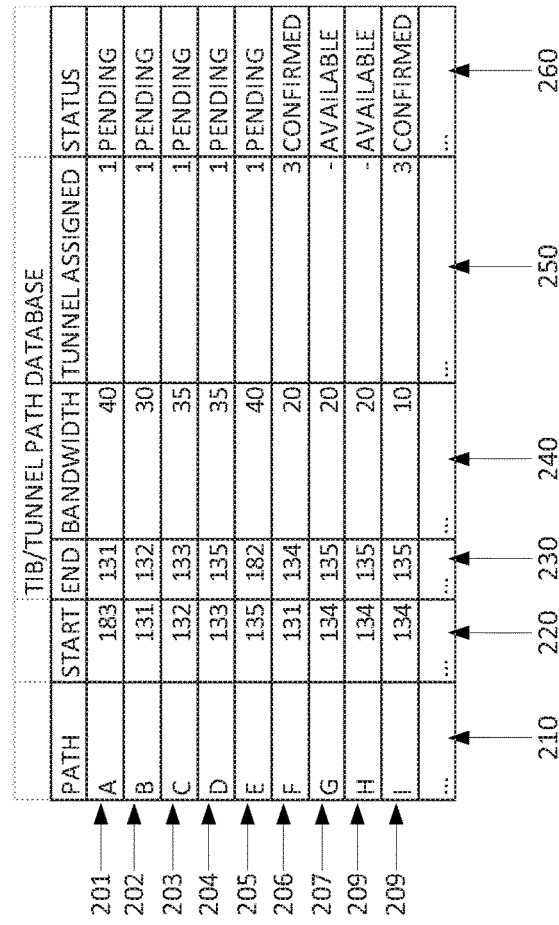
FIG. 2 illustrates an example management information block storing records for tunnel path utilization statuses, according to the present disclosure.

In one example, PCE 150 may store various data in connection with managing path utilizations for telecommunication network tunnels. For instance, PCE 150 may maintain a topology information block (TIB) that includes records for various paths between LSRs in network 105. A record may include, for example, a path identifier (ID), an identification of a start node and an end node, a capacity of the path, an ID of a tunnel to which the path is assigned, and a status of the path, and so forth. An example set of records that may be maintained by PCE 150 is illustrated in FIG. 2 and described in greater detail below.

In one example, a PCC, e.g., one of the components 181-185, unit 121, or unit 124 comprising an edge LSRs in network 105, may send a request via a PCEP session to the PCE 150 for a tunnel to a destination in the network 105. For instance, the destination may comprise one of the other edge LSRs. The tunnel may comprise, for example, a Traffic Engineering (TE) tunnel, e.g., a LSP through network 105 that may be used to distribute traffic according to a traffic engineering algorithm. The request may be for a new tunnel, or may be a request to change the paths comprising a previously deployed tunnel, e.g., due to changing traffic conditions, such as path or underlying link capacity impairments, intermediate node failures or degradations, and so forth. For instance, for a tunnel change request the starting point and ending point, e.g., the requesting edge/head LSR and the destination LSR, may remain the same, but the paths comprising the tunnel may change.

The request may include parameters such as: a size of a transmission, an anticipated duration of the transmission or a duration of a need for the tunnel, a bandwidth requirement, a latency requirement, a security requirement (e.g., no links or transport nodes in region "X," no less than advanced encryption standard (AES)-256 encryption), an identification of a customer associated with the request, and so forth. In one example, PCE 150 may then calculate a tunnel, e.g., one or more paths comprising a label switched path (LSP) through the network 105 that may satisfy all or a portion of the parameters. In one example, PCE 150 may only consider paths having a status of "available" for possible inclusion in the tunnel. Paths with status of "pending" or "confirmed" may be omitted from consideration. When the tunnel is calculated, the PCE 150 may then send a response to the requesting PCC via the PCEP session that includes at least one path comprising the tunnel through the network 105 to the destination. To illustrate, PCE 150 may receive a request from component 183 for a tunnel to carry traffic of user device 141 to user device 143. In one example, PCE 150 may calculate a tunnel comprising paths A, B, C, D, and E between component 183 and component 182. It should be noted that in calculating a tunnel for traffic of user device 141 to user device 143, PCE 150 may consider components 181 and 182 as possible end nodes, since user device 143 is dual homed. In addition, it should be noted that various internal nodes in the network 105 may have multiple paths (multi-path) between adjacent/peer nodes. For example, path C may comprise one of two possible paths between internal nodes 132 and 133.

Notably, the new tunnel may not actually take effect in the designated network elements, hence causing the TIB information of the PCE 150 to be out of sync with the current state of the network 105. However, PCEP is deemed to be reasonably reliable, i.e., the success of PCE 150 receiving a request from a PCC and the PCC receiving a response from PCE 150 are generally guaranteed and reliable. However, a response message with a new or updated tunnel configuration may not be successfully executed by the receiving PCC due to unexpected network events, such as network failures, congestions, or security attacks, such as denial of service (DOS) attacks and the like. When any of these events happen, the network information of the TIB of PCE 150 may become out of sync with the current state of network 105, including false tunnel path information. This could cause incorrect reporting by the PCE 150 to a network management system and could also cause further problems if such information were used in calculating and configuring new tunnels, or if such information were used for other aspects of configuring the network 105. In one example, when the response is sent to the requesting PCC, PCE 150 may update the TIB to change an entry or entries for the status of each path of the tunnel that is calculated from a status of "available" to a status of "pending." In this way, PCE 150 may omit consideration of paths with statuses of "pending" when calculating additional tunnels in response to additional requests from PCCs. In addition, if a network management system requests information in the TIB of the PCE 150, the PCE 150 will not provide potentially false information.

In one example, the PCC receiving the response, e.g., component 183, may configure the tunnel by further communicating to nodes along the path(s) of the tunnel. For example, component 183 may communicate to internal nodes 131, 132, 133, and 135, and to component 182 to coordinate the label switched path (LSP) of the tunnel. As such, MPLS forwarding tables of the respective internal nodes 131, 132, 133, and 135, and component 182 may be updated to support the tunnel A, B, C, D, and E. In one example, component 183 may communicate via Resource Reservation Protocol for Traffic Engineering (RSVP TE). However, in another example, Label Distribution Protocol (LDP), Constraint-based Routed LDP (CR-LDP), or the like may be utilized. Component 183 may then signal to user device 141 to begin sending packets to the network 105 via one or more of the access networks 170. The packets may initially be received in the network 105 by component 183, which may add a label and/or encapsulate the packet for label-switched routing along the route A, B, C, D, and E towards component 182, for onward transmission to user device 143 via one or more of access networks 160.

In addition, component 183 may generate a Simple Network Management Protocol (SNMP) trap message when the tunnel is successfully deployed and send the trap message to the PCE 105. When the PCE 105 receives the trap message confirming that the tunnel has taken effect, the entries/records for the status(es) of path(s) in the tunnel may be updated from "pending" to "confirmed." The loop of PCEP response and SNMP trap message confirmation assures that the statuses of tunnel paths are up to date and accurate. Notably, tunnel/path reports that are requested from the PCE 150, and network configuration/optimization algorithms that may be based on such reports will rely upon tunnel/path information that is up to date and which accounts for the possibility that tunnels that are configured by the PCE 150 may not actually be deployed by the requesting PCCs. In addition, PCE 150 is prevented for configuring new/additional tunnels which may conflict with the actual path states of various paths in the network 105.

It should be noted that in some cases, a tunnel calculated by the PCE 150 may not only fail to be deployed, but a tunnel comprising a different set of paths may be deployed by the head LSR/PCC that initially requested that PCE 150 calculate the tunnel. Accordingly, in one example, a PCC/head LSR that requested a tunnel will send an SNMP trap message that either confirms that the tunnel calculated by the PCE 150 has been deployed, or which notifies the PCE 150 of a different set of paths that was selected by the PCC and configured for use. In the latter case, PCE 150 may change the status(es) for path(s) of the tunnel that was calculated from a status of "pending" back to a status of "available." In addition, PCE 150 may change the status(es) for different path(s) which were actually configured by the PCC from a status of "available" to a status of "confirmed."

It should be noted that the system 100 has been simplified. In other words, the system 100 may be implemented in a different form than that illustrated in FIG. 1. For example, the system 100 may be expanded to include additional networks, such as NOC networks, and additional network elements (not shown) such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions and/or combine elements that are illustrated as separate devices. For example, SDN controller 155, PCE 150, and/or other network elements may comprise functions that are spread across several devices that operate collectively as a SDN controller, a PCE, etc. In another example, PCE 150 and SDN controller 155 may be integrated into a single device. In still another example, a request for a tunnel may not come directly from a head LSR, but may instead come from an intermediary device which may in turn inform the head LSR. Thus, these and other modifications of the system 100 are all contemplated within the scope of the present disclosure.

FIG. 2 illustrates an example portion of a topology information block (TIB) 200, e.g., a database of tunnel path records. Each row comprises a record, e.g., records 201-209, having a number of fields corresponding to columns 210, 220, 230, 240, 250, and 250. For instance, for each of records 201-209, an entry in column 210 may be for a path identifier (IDs) of a path, an entry in column 220 may be for a start label switched router (LSR) of the path, an entry in column 230 may be for an end LSR of the path, an entry in column 240 may be for a bandwidth or capacity of the path, an entry in column 250 may be for an ID of a tunnel to which a path is assigned (or a null entry if the path is not assigned), and an entry in column 260 may be for a status of the path, e.g., "available," "pending," or "confirmed." The records 201-209 may correspond to paths in the network 105 of FIG. 1. For instance, record 201 indicates a start LSR of 183, e.g., component 183 in FIG. 1, and an end LSR of 131, e.g., internal node 131 in FIG. 1. The TIB 200 illustrated in FIG. 2 may comprise a state after PCE 150 has calculated a tunnel (labeled as tunnel "1") comprising paths A, B, C, D, and E, and after PCE 150 has sent a response to component 183 advising of the tunnel that was calculated. For instance, if component 183 has not sent an SNMP trap message confirming that the tunnel comprising paths A, B, C, D, and E has been deployed and is in use, the status of the paths A, B, C, D, and E may remain as "pending" until the PCE 150 receives such a trap message.

As further indicated in the TIB 200, paths F and I (corresponding to records 206 and 209 respectively) are assigned to tunnel "3" and have statuses of "confirmed." In other words, the head LSR of tunnel "3" has confirmed, e.g., via an SNMP trap message, that tunnel "3," inclusive of paths F and I, has been deployed and is in use. Paths G and H (corresponding to records 207 and 208 respectively) have statuses of "available," and therefore are not currently assigned to any tunnel. For ease of illustration paths F-I are not specifically labeled in FIG. 1. However, these paths may be at least partially identified based upon the start and end LSRs indicated in the respective records 206-209.

For illustrative purposes, entries for column 240 are in arbitrary units. However, it should be noted that PCE 150 of FIG. 1 may select the tunnel comprising paths A, B, C, D, and E when the tunnel complies with a bandwidth requirement of the request received from component 183. For instance, if the bandwidth requirement is a minimum bandwidth of 30, it can be seen that all of the paths A, B, C, D, and E haven capacities in excess of 30, and therefore meet the bandwidth requirement. On the other hand, paths F-I would not appear to comply with the bandwidth requirement since each of these paths has a bandwidth of 20 or less. It should also be noted that the example of FIG. 2 is provided for illustrative purposes, and that in other, further, and different examples, the TIB 200 may have a different form. For instance, TIB 200 may include a column for a security feature of a path, a column for a reserved status of a path (e.g., certain paths may be manually provisioned such that the paths are dedicated to a particular customer, or cannot be assigned to a certain customer or customers), and so forth. In general, TIB 200 may include columns, and each record may therefore include fields corresponding to any number of path features which may be used by the PCE 150 in determining which paths should be assigned to various tunnels. Thus, these and other modifications are all contemplated within the scope of the present disclosure.

Figure 3:
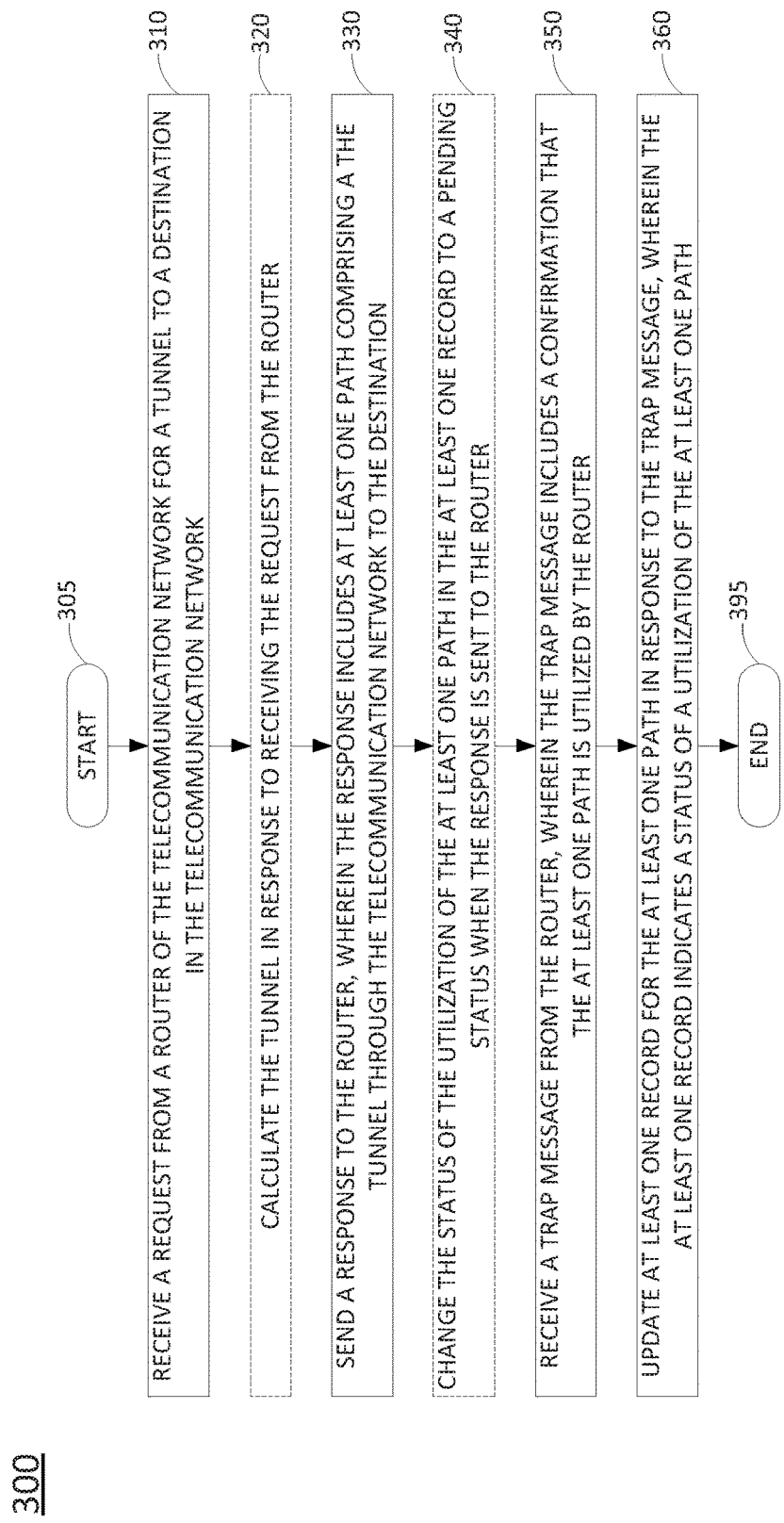
FIG. 3 illustrates a flowchart of an example method for managing path utilizations for telecommunication network tunnels.

FIG. 3 illustrates a flowchart of an example method 300 for managing path utilizations for telecommunication network tunnels, in accordance with the present disclosure. In one example, steps, functions and/or operations of the method 300 may be performed by a network-based device, such as PCE 150 in FIG. 1, or PCE 150 in conjunction with other components of the system 100. In one example, the steps, functions, or operations of method 300 may be performed by a computing device or system 400, and/or processor 402 as described in connection with FIG. 4 below. For example, computing device or system 400 may represent a PCE in accordance with the present disclosure. For illustrative purposes, the method 300 is described in greater detail below in connection with an example performed by a processor, such as processor 402. The method 300 begins in step 305 and proceeds to step 310.

At step 310, the processor receives a request from a router of the telecommunication network for a tunnel to a destination in the telecommunication network. The router may comprise an edge label switched router (LSR) at the ingress to the telecommunication network, e.g., an MPLS network, or an internal node that otherwise may function as a head LSR for the tunnel to be deployed. In one example, the request may comprise a PCEP request. Accordingly, in one example, the router may comprise a Path Computation Client (PCC) that is PCEP enabled.

At optional step 320, the processor may calculate the tunnel in response to receiving the request from the router. The processor may calculate one or more paths to include in the tunnel according to a traffic engineering (TE) algorithm, and/or based upon various factors such as, a size of a transmission, an anticipated duration of the transmission or a duration of a need for the tunnel, a bandwidth requirement, a latency requirement, a security requirement, an identification of a customer associated with the request, as well as based upon the statuses, capacities, and other features of various links that are provisioned in the telecommunication network.

At step 330, the processor sends a response to the router, the response including at least one path comprising the tunnel through the telecommunication network to the destination. The response may comprise a PCEP response message, for example.

At optional step 340, the processor may change a status of a utilization of the at least one path in at least one record to a pending status when the response is sent to the router. For instance, the processor may maintain a topology information block (TIB) or the like with records pertaining to a plurality of paths in the network. Each record may include, for example, a path identifier (ID), an identification of a start node and an end node, a capacity of the path, an ID of a tunnel to which the path is assigned, a status of the path, and so forth. Accordingly, a status of each path in the tunnel in a respective record for the path may be updated to "pending" when the processor sends the response to the router.

At step 350, the processor receives a trap message from the router, the trap message including a confirmation that the at least one path (i.e., the tunnel) is utilized by the router. For instance, as mentioned above, the router may comprise a head LSR that is the initial router in the tunnel. The router may communicate with other nodes along paths of the tunnel using RSVP TE to communicate label information of the tunnel, or to otherwise cause MPLS forwarding tables of the respective nodes along the tunnel path(s) to be updated. When the tunnel is deployed in this way and is used for the routing of traffic, the router may send an SNMP trap message to the processor confirming that the tunnel and/or the path(s) of the tunnel are in use. However, it should be noted that in another example, if the router fails to utilize the tunnel for any reason, the router may send an SNMP trap message indicating that the deployment of the tunnel failed and/or identifying a different tunnel comprising a different set of paths that the router determined to use instead, and so forth.

At step 360, the processor updates the at least one record for the at least one path in response to the trap message. For instance, as stated above, the at least one record may indicate a status of a utilization of the at least one path. Accordingly, at step 360 the processor may update the status from "pending" to "confirmed" when the trap message indicates that the tunnel comprising the at least one path is in use, or deployed.

Following step 360 the method 300 proceeds to step 395. At step 395, the method 300 ends.

It should be noted that the method 300 may be expanded to include additional steps. For instance, in one example the processor may repeat the steps of the method 300 by receiving a further request from the same or a different router for a tunnel, calculating a tunnel based upon various parameters of the request, the current statuses of various paths and/or other features of the paths, etc., sending a response to the requesting router, updating a status in one or more records for paths of the tunnel, e.g., to a "pending" status, receiving an additional trap message, updating a record or records associated with one or more paths of the tunnel, e.g., to a "confirmed" status, and so forth. In one example, paths having statuses of "pending" or "assigned" as a result of previous iterations of the method 300 may be excluded from consideration for inclusion in the tunnel being calculated in a current iteration of the method 300. In still another example, the processor may receive a request, e.g., from a network management system for a current status of paths in the telecommunication network, and the processor may respond with one or more of the records in a TIB maintained by the processor. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the example method 300 can be stored, displayed and/or outputted to another device as required for a particular application. Furthermore, steps or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for managing path utilizations for telecommunication network tunnels, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one embodiment, instructions and data for the present module or process 405 for managing path utilizations for telecommunication network tunnels (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for managing path utilizations for telecommunication network tunnels (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A device comprising:
   a processor deployed in a telecommunication network; and
   a computer-readable medium storing instructions which, when executed by the processor, cause the processor to perform operations, the operations comprising:
   receiving a request from a router of the telecommunication network for a tunnel to a destination in the telecommunication network;
   sending a response to the router, wherein the response includes at least one path comprising the tunnel through the telecommunication network to the destination;
   receiving a trap message from the router, wherein the trap message includes a confirmation that the at least one path is deployed and is in use in routing of traffic by the router; and
   updating, responsive to the confirmation, at least one record for the at least one path in response to the trap message, wherein the updating comprises updating a status of a utilization of the at least one path in the at least one record.

2. The device of claim 1, further comprising:
   changing the status of the utilization of the at least one path in the at least one record to a pending status when the response is sent to the router.

3. The device of claim 2, wherein the updating of the at least one record comprises changing the status of the utilization of the at least one path in the at least one record to a confirmed status, in response to the receiving the trap message that includes the confirmation that the at least one path is deployed and is in use in routing of traffic by the router.

4. The device of claim 1, further comprising:
   calculating the tunnel in response to the receiving the request from the router.

5. The device of claim 1, wherein the tunnel comprises a traffic engineering tunnel.

6. The device of claim 1, wherein the trap message comprises a simple network management protocol trap message.

7. The device of claim 1, wherein the processor comprises a processor of a path computation element.

8. The device of claim 1, wherein the request comprises a path computation element protocol request message.

9. The device of claim 1, wherein the response comprises a path computation element protocol response message.

10. The device of claim 1, wherein the router comprises a path computation client.

11. The device of claim 1, wherein the tunnel comprises a label switched path.

12. The device of claim 1, wherein the router comprises a label switched router.

13. The device of claim 1, wherein the router comprises a head router of the tunnel.

14. The device of claim 1, wherein the router deploys the tunnel via a resource reservation protocol for traffic engineering message to at least one additional router of the telecommunication network.

15. The device of claim 1, wherein the telecommunication network comprises a multiprotocol label switching network.

16. A non-transitory computer-readable medium storing instructions which, when executed by a processor deployed in a telecommunication network, cause the processor to perform operations, the operations comprising:
   receiving a request from a router of the telecommunication network for a tunnel to a destination in the telecommunication network;
   sending a response to the router, wherein the response includes at least one path comprising the tunnel through the telecommunication network to the destination;
   receiving a trap message from the router, wherein the trap message includes a confirmation that the at least one path is deployed and is in use in routing of traffic by the router; and
   updating, responsive to the confirmation, at least one record for the at least one path in response to the trap message, wherein the updating comprises updating a status of a utilization of the at least one path in the at least one record.

17. The non-transitory computer-readable medium of claim 16, wherein the operations further comprise:
   changing the status of the utilization of the at least one path in the at least one record to a pending status when the response is sent to the router.

18. The non-transitory computer-readable medium of claim 17, wherein the updating of the at least one record comprises changing the status of the utilization of the at least one path in the at least one record to a confirmed status, in response to receiving the trap message that includes the confirmation that the at least one path is deployed and is in use in routing of traffic by the router.

19. The non-transitory computer-readable medium of claim 16, wherein the operations further comprise:
   calculating the tunnel in response to the receiving the request from the router.

20. A method comprising:
   receiving, by a processor deployed in a telecommunication network, a request from a router of the telecommunication network for a tunnel to a destination in the telecommunication network;
   sending, by the processor, a response to the router, wherein the response includes at least one path comprising the tunnel through the telecommunication network to the destination;
   receiving, by the processor, a trap message from the router, wherein the trap message includes a confirmation that the at least one path is deployed and is in use in routing of traffic by the router; and
   updating, by the processor and responsive to the confirmation, at least one record for the at least one path in response to the trap message, wherein the updating comprises updating a status of a utilization of the at least one path in the at least one record.

\* \* \* \* \*